J. S. ERICSON.
LOCKING FAUCET.
APPLICATION FILED JULY 13, 1909.
958,735.
Patented May 24, 1910.
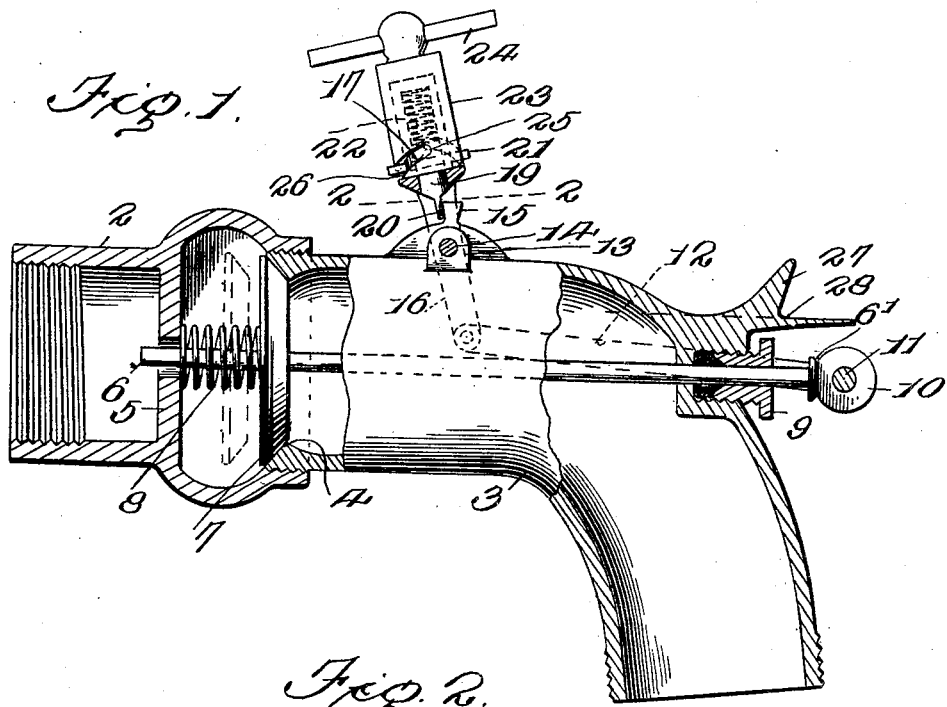
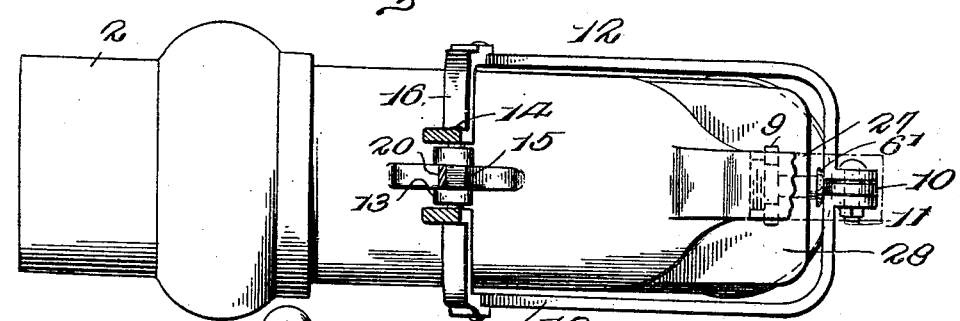
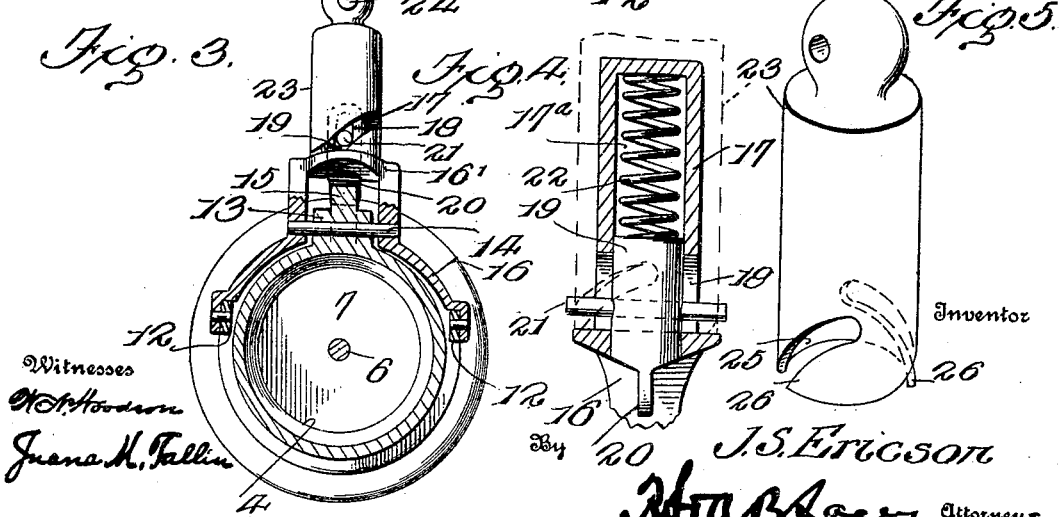
Inventor
J. S. Ericson

UNITED STATES PATENT OFFICE.

JOSEPH S. ERICSON, OF BURBANK, CALIFORNIA.

LOCKING-FAUCET.

958,735.	Specification of Letters Patent.	Patented May 24, 1910.

Application filed July 13, 1909. Serial No. 507,386.

*To all whom it may concern:*

Be it known that I, JOSEPH S. ERICSON, citizen of the United States, residing at Burbank, in the county of Los Angeles and State of California, have invented certain new and useful Improvements in Locking-Faucets, of which the following is a specification.

My invention relates to faucets and particularly those faucets wherein means are provided for locking the faucet in either its open or its closed position and preventing the actuation of the faucet except by means of a key, this particular class of faucet being designed with reference to tank wagons, but not necessarily confined to this use.

The invention includes in general terms, a faucet body having therein a valve, a lever pivoted on the faucet body and connected to the valve to open or close the same, a locking device on the lever engaging with the faucet body and preventing a movement of the lever after it has been set in one or the other position and a key adapted to withdraw the catch and permit the movement of the lever by actuation of the internal valve.

My improved invention is shown in the accompanying drawings, wherein:

Figure 1 is a side view, partly sectional, of a faucet constructed in accordance with my invention; Fig. 2 is a top view thereof, the actuating lever being in section; Fig. 3 is a vertical transverse section of the faucet taken just forward of the actuating lever; Fig. 4 is a detail enlarged section of the upper end of the actuating lever, and Fig. 5 is a perspective view of the key.

Corresponding and like parts are referred to in the following description and indicated in all the views of the drawings by the same reference characters.

Referring to these figures, A designates a faucet body of any usual construction and which is usually made of brass or other metal. This body is formed in two portions, a rear portion 2 and a mouth portion 3. The part 3 is screw threaded into the rear portion 2 and the rear portion is screw threaded for engagement with the tank, pipe or other receptacle. The rear end of portion 3 is beveled, as at 4, to form a valve seat while the portion 2 is provided with the transverse bar 5 perforated at its middle to provide a bearing for a longitudinally movable valve spindle 6 which extends through the bar 5 and at its other end extends through the forward end of the faucet body, preferably through a stuffing box 9 which prevents the escape of oil around the valve stem. A valve 7 is carried upon the spindle 3 which has a bevel face adapted to close against the bevel face seat 4. A spring 8 acts to normally hold the valve in place against the seat. Under ordinary conditions and when there is considerable pressure of liquid behind the valve, this pressure will hold the valve closed, but after the liquid in the tank has been greatly reduced, there would not be enough pressure behind the valve to hold it closed, and hence the necessity of providing the spring 8.

The forward end of the spindle or rod 6 is formed with a disk 6' which contacts with the front end of the stuffing box, and the extremity of the rod 6 is also provided with the eye 10 through which passes a cross bar 11 pivotally connected at its ends to two rearwardly extending links 12 located one on each side of the faucet body, these links being outwardly spread at their rear ends to conform to the contour of the faucet body.

Formed upon the upper portion of the faucet body, preferably upon the part 3, is the rib 13 which forms a bearing or a transverse pivot pin 14. The middle of this bearing 13 is formed with the upwardly projecting inwardly beveled lug 15. Mounted upon the pivot pin 14 is the bifurcated lever 16, the two arms of which extend downward partially around the faucet body on each side and at their lower ends are cut away and pivoted to the rear ends of the links 12. The upper end of the lever at its middle is formed with a cylindrical hub 17 slotted at its sides, as at 18, which slots extend into a socket 17ª formed in the interior of the hub. This socket opens on the under face of the lever immediately in alinement with the locking lug 15. Mounted within the socket is the shiftable detent 19 formed at its lower end with the detent tooth 20 which projects through the opening in the lower end of the socket and is adapted to engage with the upwardly projecting lug 15. A cross pin 21 projects through the detent and passes through the slots 18 in the socket. A spring 22 is located within the socket and bears against the upper end of the detent, forcing it downward and yieldingly holding it in this position or in locking engagement with the lug 15.

As a means of raising the detent sufficiently so as to clear the lug 15, I provide the cylindrical key 23 which at its upper end is provided with a cross bar or handle 24 and at its lower end is adapted to engage with the detent and to lift the same.

It is to be understood that the spring 22 is of such strength that it will hold the detent down into its locking engagement against all ordinary efforts to press the spring, but the lower end of the key is so formed as to exert a wedging action upon the detent to raise it from its locking engagement. To this end a key is provided upon its opposite sides with the inclined slots 25, these slots opening to the lower end of the key so that the wedge-like projection 26 is formed, which may be inserted beneath the cross bar or cross pin 21 to wedge the same upward as the cylindrical key is rotated. The slots 25 are, of course, directed reverse to each other so that the rotation of a key in one direction will raise both ends of the pin 21. It will be noted, of course, that the upper edges of the projections 26 form cam faces upon which the pins ride. The projecting end of the spindle 6 should, of course, be protected against any danger of breakage and to that end is so located as to be protected by the usual nose 27. It may be still further protected by forming a laterally projecting flange 28 beneath the nose 27 which shall extend out over the eye 10. The cylindrical hub is of such height and extends so far into the socket of the key that a good connection is formed between the key and lever for the actuation of the latter.

The operation of my invention is evident from the drawing. Assuming that the valve is closed and that it is desired to open the valve, it is only necessary to apply the key 23 and rotate the same, whereupon the detent is raised from engagement with the locking lug and the lever 16 is pulled forward, forcing back the spindle and opening the valve against the force of the liquid in the reservoir and against the force of the spring 8. These parts may be locked in this position by withdrawing the key, whereupon the spring 22 will force the detent down on the other side of the locking lug and the valve will be held open until it is desired to close same. When the key is withdrawn, it is impossible to actuate the valve for the reason that the spring 22 is of such strength that the detent can not be lifted without the aid of a key, and until lifted the detent locks the valves closed. It will be seen also that the key forms a handle for operating the valve as well as for unlocking the detent.

My invention is simple and easily constructed and thoroughly effective in operation.

Having thus described the invention, what is claimed as new is:

1. A faucet body, a valve within the faucet body adapted to close the passage therethrough, an operating lever connected with said valve and mounted exteriorly to the faucet body, a detent mounted on the lever, a lug on the faucet body with which said detent engages to hold the valve in its open or closed position, and a key engageable with the lever and adapted to lift the detent out of engagement with the lug.

2. The combination with a faucet body, of an interior valve controlling the passage way through the faucet body, a valve rod extending through the faucet body, a lever connected with the valve rod, a locking lug on the valve body, a movable detent on the lever engaging the said lug, and a locking key engageable with said detent, said key being formed with inclined cam faces engaging with the detent and adapted upon a rotation of the key to raise the detent from its engagement with the lug.

3. The combination with a faucet body, of an interior valve closing the passage therethrough, a valve rod, a lever pivoted to the outside of the faucet body and connected to the valve rod, a movable detent carried by the lever and engaging with the valve body to hold the lever in one position or another, pins projecting from the detent, and a rotatable key detachable from the lever, but engageable therewith, said key having cam faces formed thereon adapted to engage with the said pins to raise said pins and detent when the key is turned in one direction.

4. The combination with a faucet body having an interior valve seat, of a valve movable against said seat, a rod upon which said valve is mounted extending through the faucet body, a bifurcated lever pivoted upon the faucet body and having its legs connected to the end of said valve rod, said bifurcated lever at its upper end being formed with a cylindrical upwardly extending hub formed with a socket, a detent carried in said socket and engaging with the valve body to hold the lever in one or another position, and a rotatable key formed with a cylindrical socket engageable over said hub, the lower end of said key formed with cam faces adapted to engage with the detent and lift the same upon a rotation of the key.

5. The combination with a faucet having an interior valve seat, of a valve therein, a valve rod projecting through the faucet, a bifurcated lever mounted on the faucet body, links connecting the ends of the lever with the valve rod, an upwardly projecting hub formed on said lever, a locking device mounted within the hub and engaging with the body of the faucet to lock the lever set in one or another position, and a key fitting over the hub and engaging with the same to provide a means for moving the lever, said key being formed with means whereby the detent may be raised from its locking engagement with the faucet.

6. The combination with a faucet having an interior valve seat, of a valve closing against said seat, a valve rod passing through the faucet, a bifurcated lever pivotally mounted on the faucet, links connecting the legs of said lever with the valve rod, an upwardly projecting cylindrical hub formed on the lever and having an interior socket, the opposed sides of the hub being slotted into said socket, a detent carried within the socket, a lug on the faucet body on either side of which the detent engages, a spring within the socket forcing said detent into engagement with the faucet body, pins projecting from the detent through said slots, and a cylindrical locking key adapted to fit over said hub and having at its lower end opposed upwardly inclined slots into which said pins will project when the key is in place and by which when the key is rotated said pins shall be raised.

7. The combination with a faucet made in two parts, and having an interior valve formed upon the rear end of one of said parts, of a valve closing against said seat and controlling the passage of liquid through the faucet, a valve rod supported at one end in the interior of the faucet and at its other end passing through the faucet, a stuffing box through which the rod passes, a spring surrounding the rod and forcing the valve to its seat, a bifurcated lever pivoted upon the upper face of the faucet, links connecting the legs of the lever with the valve rod, a bevel sided lug upwardly projecting from the faucet body beneath the said bifurcated lever, a hub projecting from the lever and having a socket formed on its interior, said socket being slotted on opposite sides to the interior of the hub, a detent carried in said socket and having a pivot engaging with said locking lug, a spring forcing said detent downward, opposed cross pins extending through the slots, and a cylindrical key having a key socket at its lower end adapted to fit over said hub and rotate thereon, said socket at its lower end being formed with opposed upwardly extending slots adapted to engage with said cross pins to raise the same upon a rotation of the key.

In testimony whereof I affix my signature in presence of two witnesses.

JOSEPH S. ERICSON. [L. S.]

Witnesses:
 Louis Olson,
 Ursula Schelling.